United States Patent [19]
Lin et al.

[11] Patent Number: 5,572,626
[45] Date of Patent: Nov. 5, 1996

[54] FUZZY MEMBERSHIP FUNCTION GENERATOR USING RESONANT TUNNELING DIODES

[76] Inventors: Hung C. Lin, 8 Schindler Ct., Silver Spring, Md. 20903; Sen-Jung Wei, 10659-C Maplewood Dr., Cupertina, Calif. 95014; Hao Tang, 2205 Mark Ct., Silver Spring, Md. 20910

[21] Appl. No.: 246,296

[22] Filed: May 19, 1994

[51] Int. Cl.$^6$ .................................................. G06G 7/00
[52] U.S. Cl. ................................................ 395/3; 395/900
[58] Field of Search ...................... 364/807; 365/175; 395/3, 10, 61, 900

[56] References Cited

U.S. PATENT DOCUMENTS

| | | | |
|---|---|---|---|
| 5,247,472 | 9/1993 | Nagazumi | 364/807 |
| 5,280,445 | 1/1994 | Shieh et al. | 365/175 |

OTHER PUBLICATIONS

Tang et al, "Multi-peak resonant tunneling diodes based defuzzifiers;" Proceedings. The twenty-fourth internatinal sympsosium on multiple-valued logic, pp. 156-161, 25-27 May 1994.

Primary Examiner—Tariq R. Hafiz

[57] ABSTRACT

The folding V-I characteristic of a resonant tunneling diode (RTD) is utilized to generate the multiple membership functions for each antecedent. The folding characteristic of an RTD generally has a triangular shape, which corresponds to the popular membership function functions commonly in use. The amount of overlap of adjacent membership functions can be adjusted by adding or substracting a dc current to or from the RTD characteristic. The use of RTD folding characteristic to generate multiple membership functions can be used in a fuzzifier to simplify circuit implementation. A time varying membership function can be generated by sweeping the RTD with a voltage ramp. This time varying membership function can be used in the defuzzifier to obtain a crisp output.

10 Claims, 9 Drawing Sheets

FUZZY MEMBERSHIP FUNCTION GENERATOR USING RESONANT TUNNELING DIODES

TECHNICAL FIELD

This invention relates to the field of fuzzy logic. In particular, resonant tunneling diodes (RTD) are used to implement fuzzifiers.

BACKGROUND OF THE INVENTION

In a fuzzy logic system, linguistic rules instead of analytical formulas are used to obtain a solution. In so doing, it is often faster and more economical to solve a problem. In recent years, there has been a great deal of progress in the area of fuzzy logic, and it is widely used in micro-controllers.

In fuzzy logic, membership functions are used to classify an input variable (antecedent) into varying degrees of different labels rather than "0" or "1" used in binary logic. The popular membership functions generally have triangular or trapezoidal shapes, and presently mostly generated with complementary metal-oxide-semiconductor (CMOS) technology.

However, in conventional fuzzifiers, every label for any antecedent requires an individual membership function circuit to generate one membership function, and such a circuit is of a rather complicated threshold type, which increases the fuzzifier circuit component count in proportion to the number of membership labels. The complexity inceases the cost and slows down the operation of the fuzzy system.

SUMMARY

An object of this invention is to generate the multiple membership functions of fuzzy logic system with resonant tunneling diodes. Another object of this invention is to simplify the circuit implementation of a fuzzifier in the system. Still another object of this invention is to speed up the operation of a fuzzy logic system.

These objects are achieved by utilizing the folding V-I characteristic of a resonant tunneling diode to generate the multiple membership functions for each input antecedent. The folding characteristic of an RTD generally has a triangular shape, which corresponds to the popular membership functions now commonly in use. The amount of overlap of the adjacent membership functions can be adjusted by adding or subtracting a dc current to or from the RTD characteristic.

BRIEF DESCRIPTION OF THE DRAWINGS

FIG. 2a shows a folding V-I characteristic of an ideal resonant tunneling diode. FIG. 2b shows the folding characteristic with a constant current added to the original folding characteristic. FIG. 2c shows the folding characteristic when a constant current is substracted from the original folding characteristic. FIG. 2d shows the combined effect of FIG. 2b and FIG. 2c.

FIG. 3b shows a circuit implementation of FIG. 3a.

DETAILED DESCRIPTION OF THE PREFERRED EMBODIMENT

Figure 1:
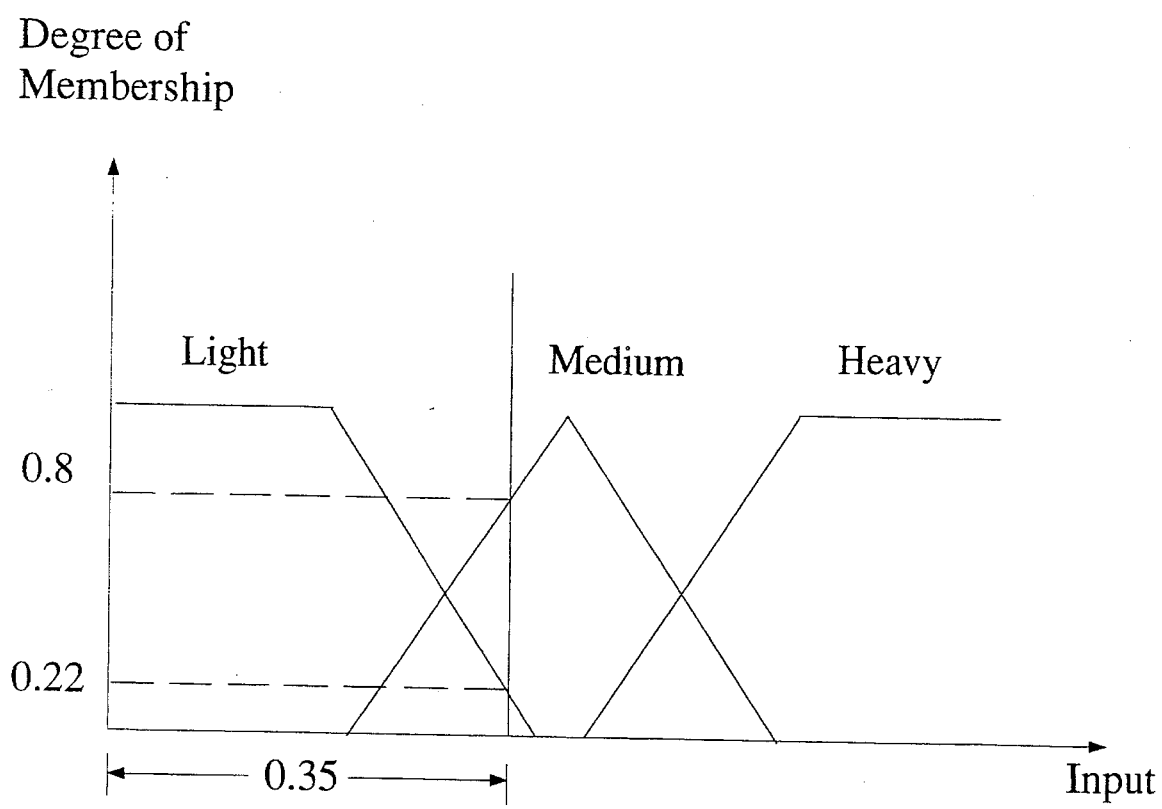
FIG. 1 shows the example of a membership function.

In fuzzy logic, every antecedent has a number of labels such as heavy, medium and light shown in FIG. 1. Each label has a membership function varying from zero membership to full membership to zero, such as a Lambda shape or a Pi shape function. When a crisp input is applied, this quantity is fuzzified to a membership grades in different labels. The different combinations of the membership grades of different antecedents are governed by linguistic rules (inference) to yield certain output (consequent) labels in the form of "IF" and "THEN" statements. The consequents are then defuzzified to yield a crisp output, for instance, by finding the centroid of the truncated output memberships.

In the fuzzy set shown in FIG. 1. Each crisp input is transformed into different degrees of membership in the different labels. In this figure, the input variable density is fuzzified into three labels: light, medium and heavy. Thus, an input density of 0.35 has a degree of membership in the "light" label of 0.22 and a degree of membership in the "medium" label of 0.80. Note that the two adjacent labels overlap each other and have two different degrees of membership in the two adjacent labels for each input.

Figure 2A:
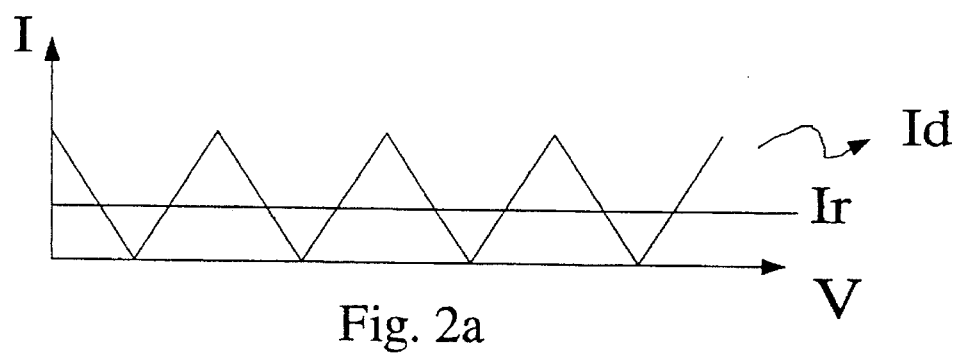
FIGS. 2a–d show the process for generating overlapping membership function from a folding V-I characteristic based on this invention.

An RTD has a typical folding V-I characteristic as shown in FIG. 2a. The number of folds can be utilized to correspond to the number of labels. Thus, the membership functions of all the labels for one input can be generated with one RTD.

Figure 2B:
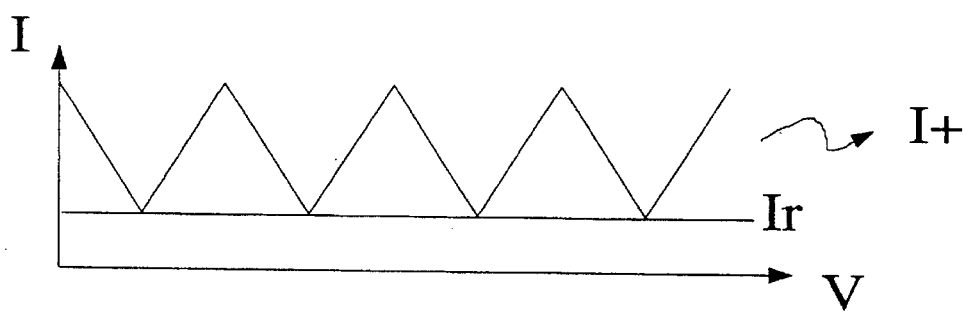
Figure 2C:
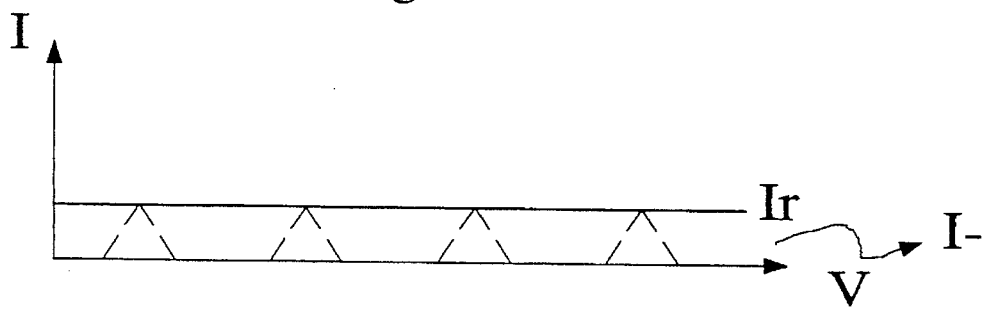
Figure 2D:
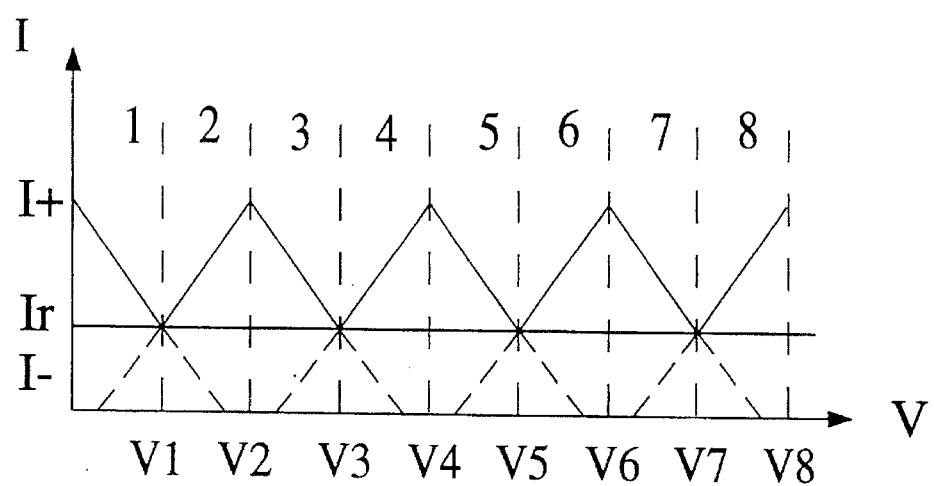

In the regions where the membership functions overlap, any particular input produces two different degrees in two adjacent membership functions. For instance, an input of 0.35 in FIG. 1 produces a degree of 0.22 membership in the "light" label, and a degree of 0.8 membership in the "medium" label. These two degrees can be produced by superimposing a constant current on the folding V-I characteristic. FIG. 2a shows an ideal folding V-I characteristic of an RTD. When a constant Ir is superimposed, the current is raised as shown in FIG. 2b. The extensions of the current is shown in dotted lines in FIG. 2c. This extended characteristic can be obtained by subtracting the folding current from a constant current Ir and removing the negative values after current subtraction by clamping. Then the characteristics of FIG. 2b and the characteristics of FIG. 2c are combined and the resultant characteristic is shown in FIG. 2d. Thus, overlapping membership functions are generated. For instance, the same membership corresponds to the added current in region 1 and the subtracted current in region 2. Between the input voltage Va and Vb, the degree of membership is zero, implying that the subtracted current should not be negative, but equal to zero.

Figure 3A:
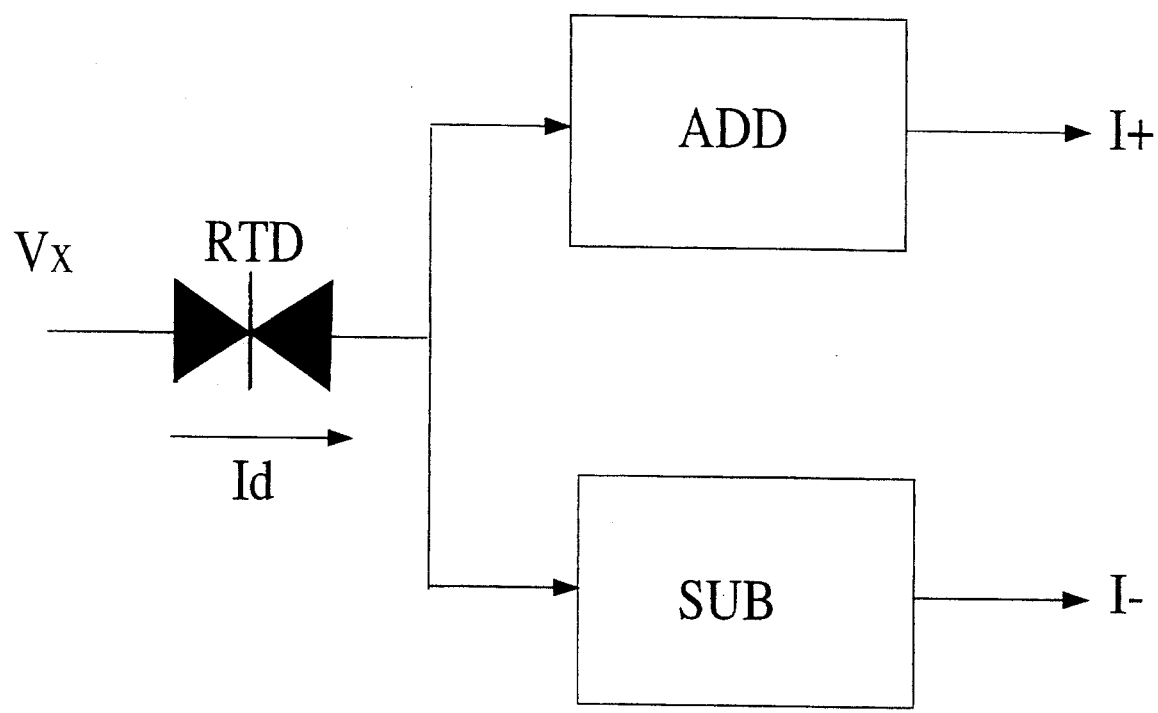
FIG. 3a shows the block diagram of a current mode fuzzifier.
Figure 3B:
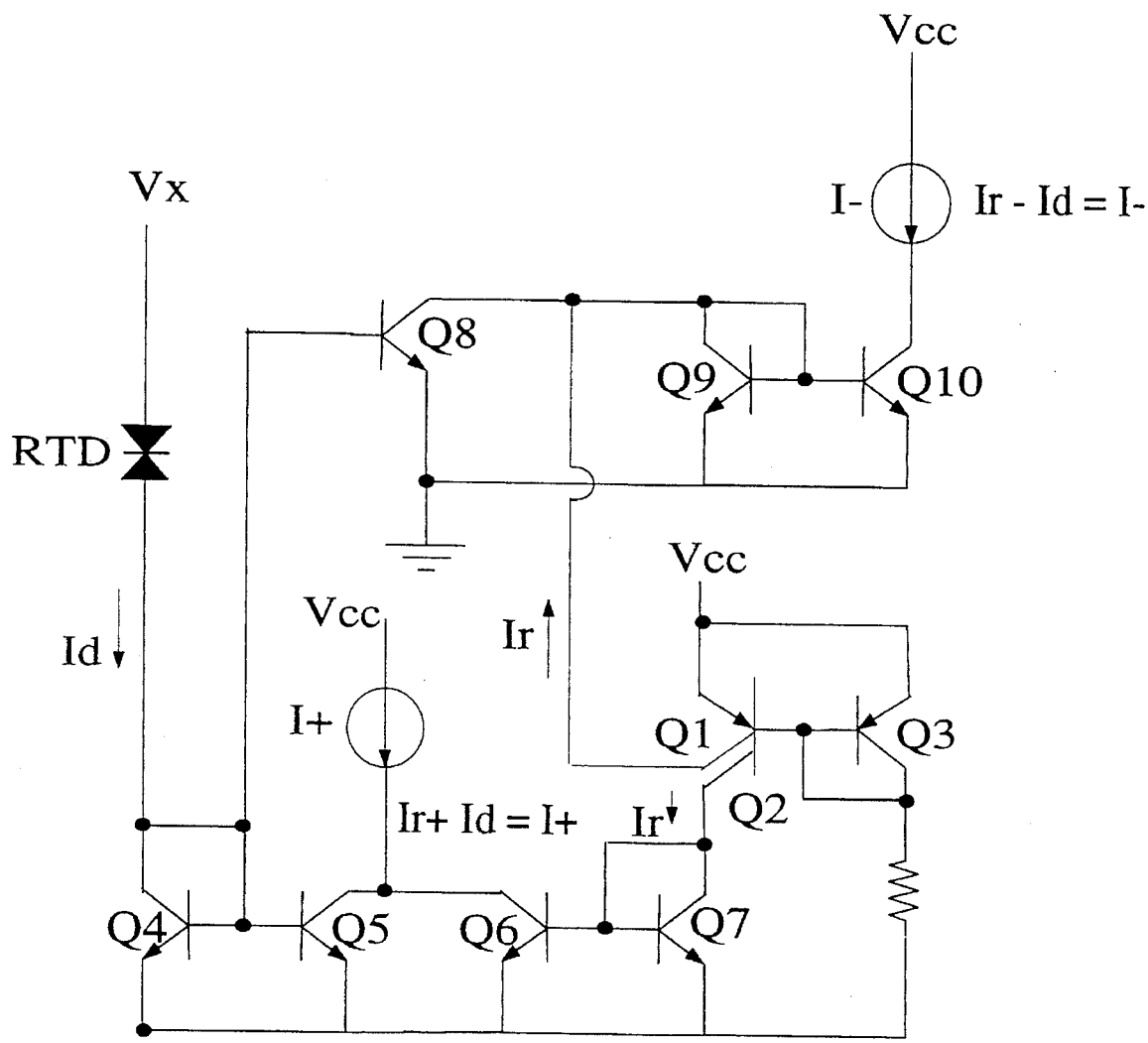

The RTD fuzzifier can be implemented as shown in FIG. 3a. An input voltage Vx is applied across an RTD. The current Id through the RTD is sensed. The two output currents I+ and I− are demultiplexed to determine whether the input signal lies in an non-overlap region or if the input signal lies in an overlap region, and whether the higher degree of membership or the lower degree of membership should be chosen. The current adder is to adjust the overlapping range, and the current subtractor is to obtain the lower degree of membership in the overlapping region. The output of the subtractor should be clamped to zero when the value of the subtraction is negative. A circuit example of the current mode fuzzifier is shown in FIG. 3b.

Figure 4:
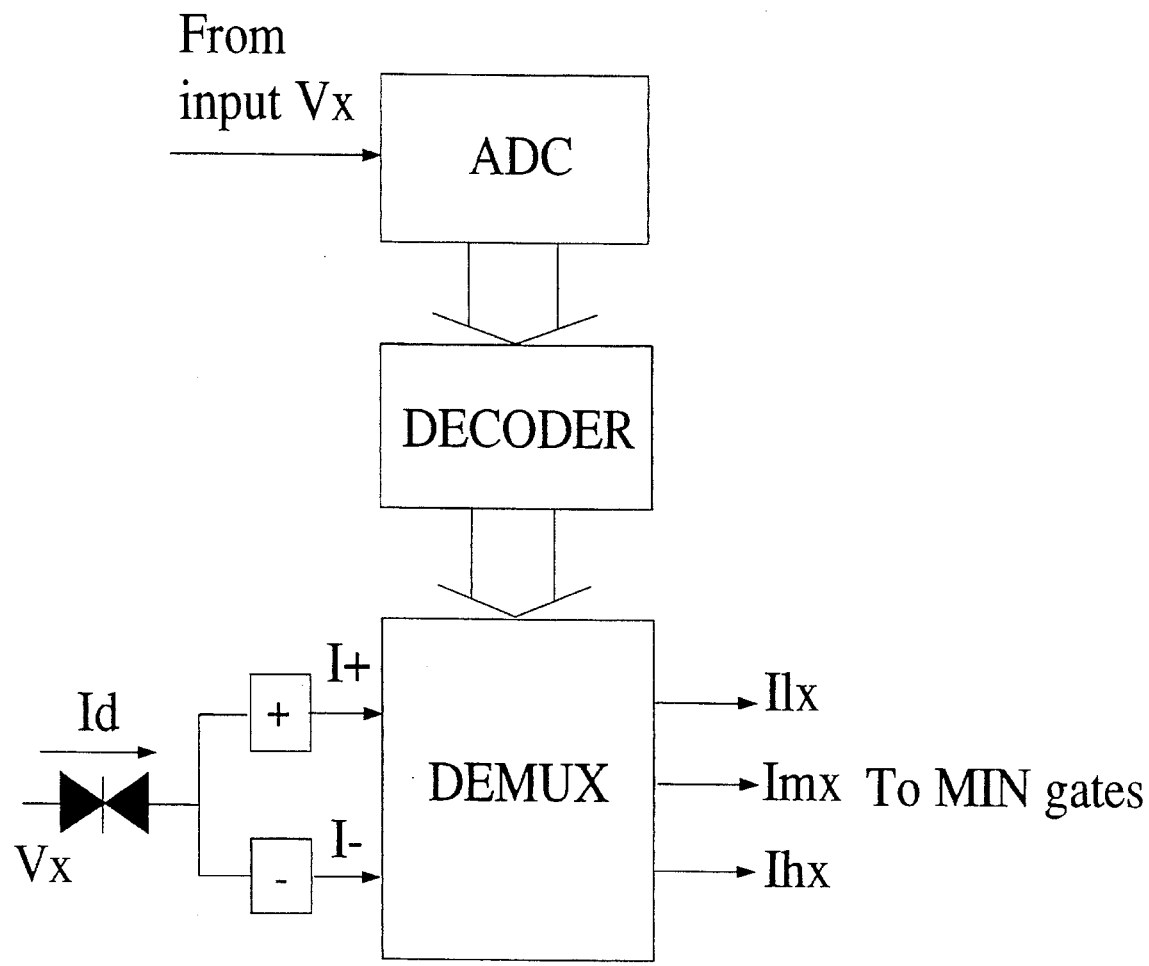
FIG. 4a shows the block diagram for membership selection for input variable Vx.
FIG. 4b shows a demultiplexer for membership grade selection.
Figure 4B:
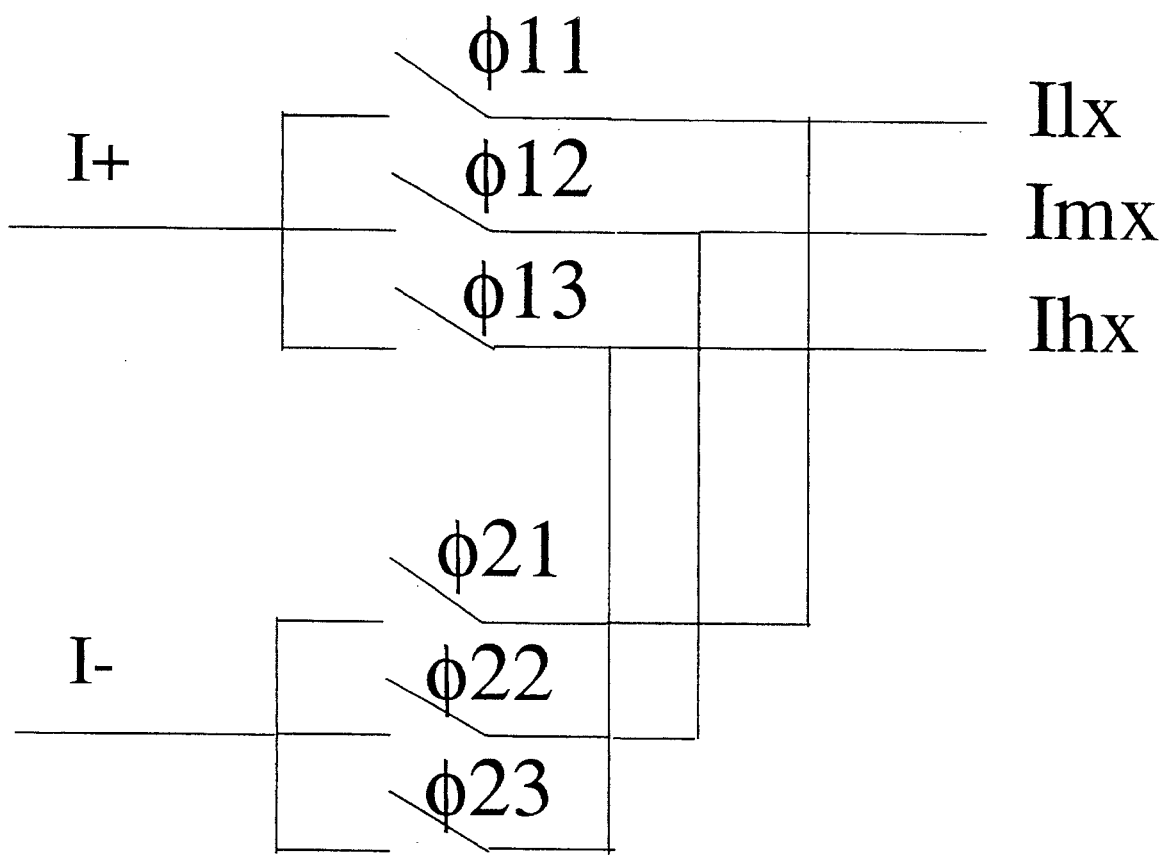
Figure 5:
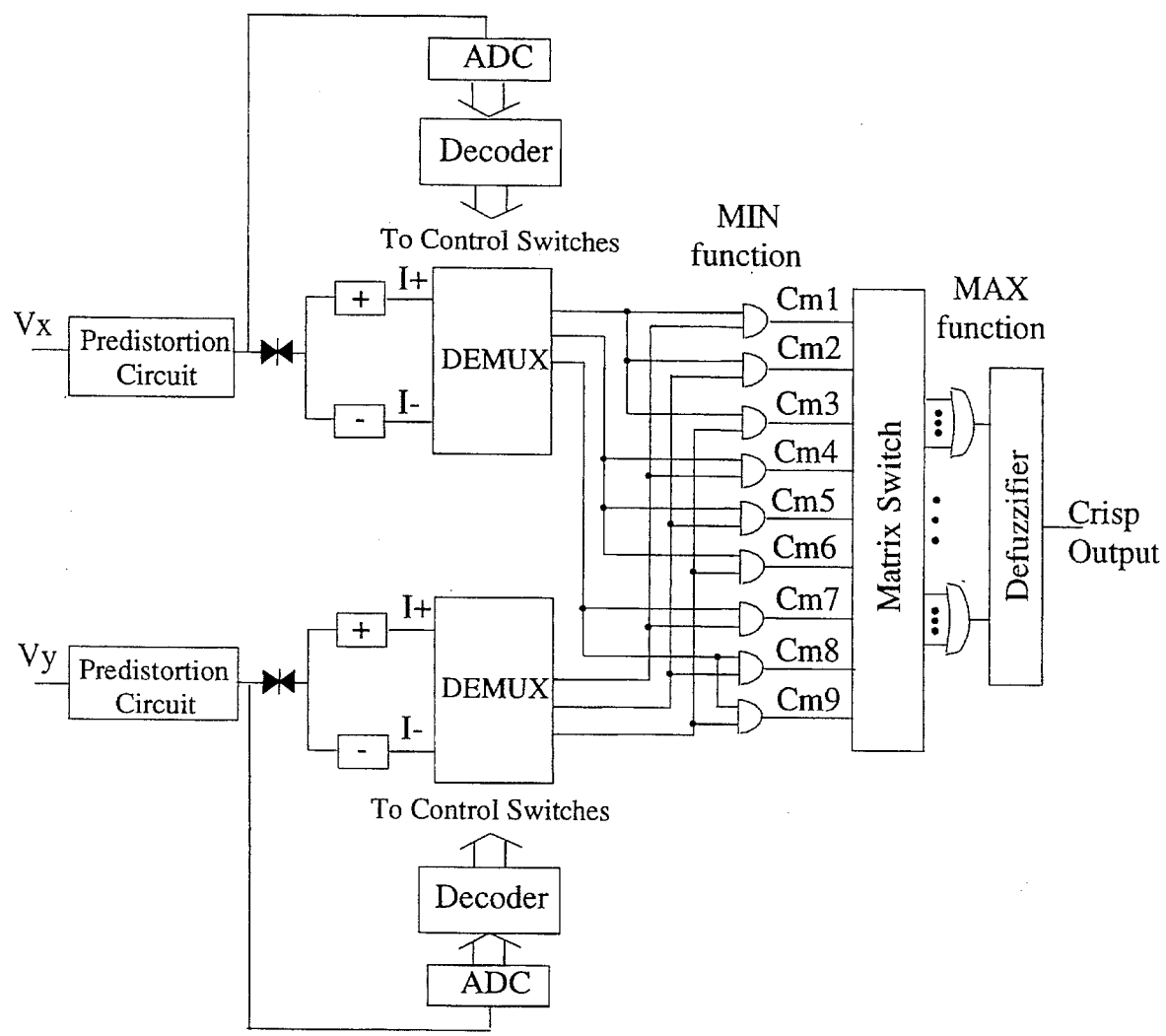
FIG. 5 shows a fuzzy logic controller hardware architecture.

These functions can be accomplished by a demultiplexer which is controlled by the input voltage through an analog-to-digital converter as shown in FIG. 4a. For the demultiplexer shown in FIG. 4b, the added input signal is indicated as I+ and the subtracted input signal is indicated as I−. The output of each demultiplexer yields all the membership such as Ilx, Imx, Ihx for one input Vx, and Ily, Imy, Ihy for input Vy. The entire fuzzy controller architecture is shown in FIG. 5. The fuzzy AND of any combination of Ix and Iy is the lesser of the two values, which is derived from a MIN circuit. With i numbered inputs, each with labels j, there can be $j^i$ fuzzy AND outputs. These fuzzy AND outputs Cm1 . . . Cm9 represent a grade of matching premise with the antecedent of a rule, which governs the antecedent and the consequent.

Figure 6A:
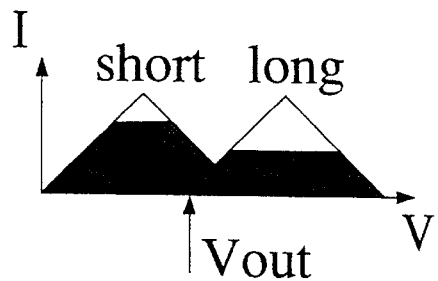
FIG. 6a shows the center of gravity of two output memberships.

Suppose the consequent has another set of labels such as long and short as shown in FIG. 6a. The labels also have a Lambda or Pi shaped membership functions. Each rule infers the relationship (truth table) between two or more input membership (IF) and the output membership (THEN). The output membership function is weighted by the fuzzy AND output of the MIN circuit by means of a truncation gate (rules matrix). The truncated (inference) outputs are fed to a MAX to obtain a fuzzy output. The fuzzy output is defuzzified (e.g. by a center-of gravity method) to obtain a crisp output. The method is governed the following equation:

$$V_{crisp} = \int nI_i \, dt / \int I_i \, dt,$$

where n is a first order linear function of time and is measured in volts, and $I_i$ is the magnitude of current after truncation.

Figure 6B:
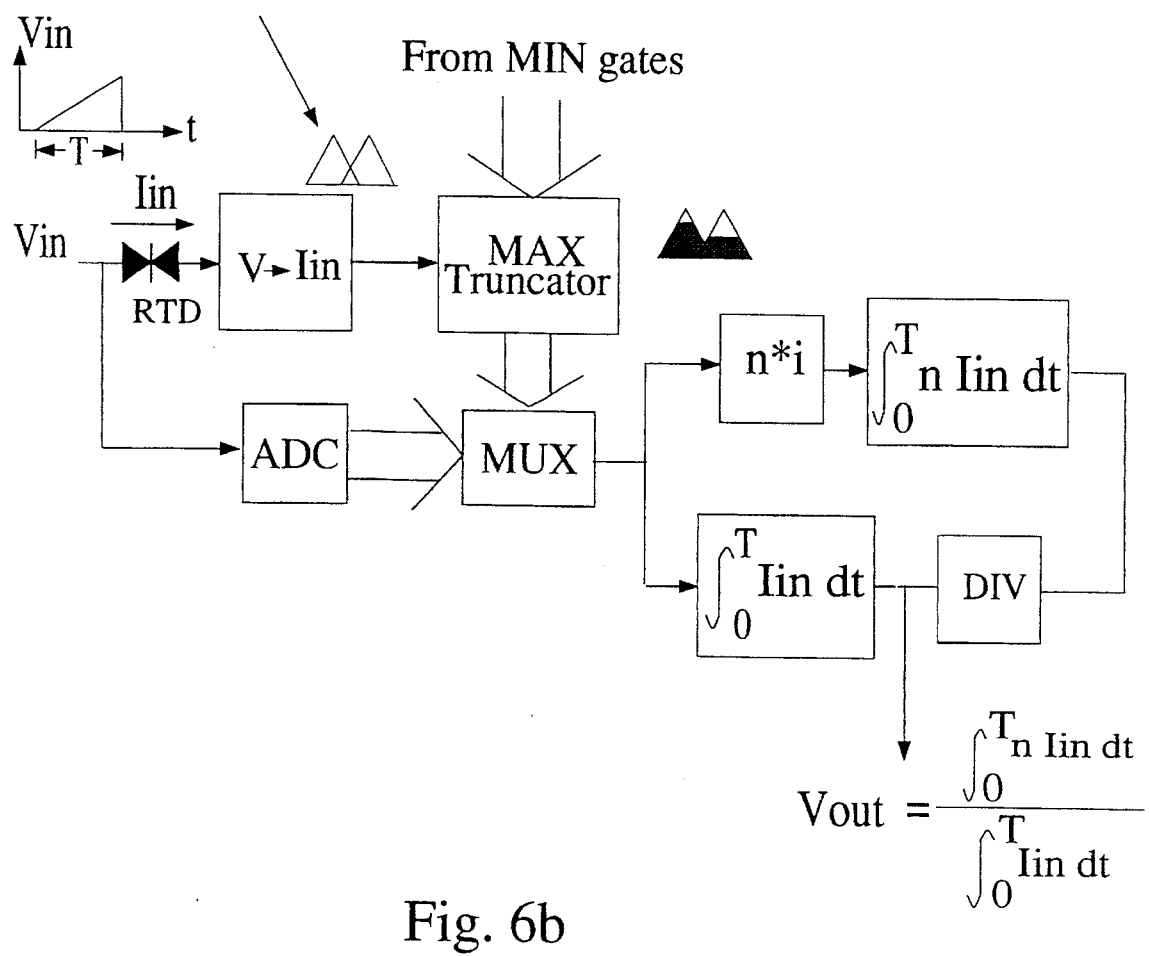
FIG. 6b shows the block diagram of defuzzification.
Figure 6C:
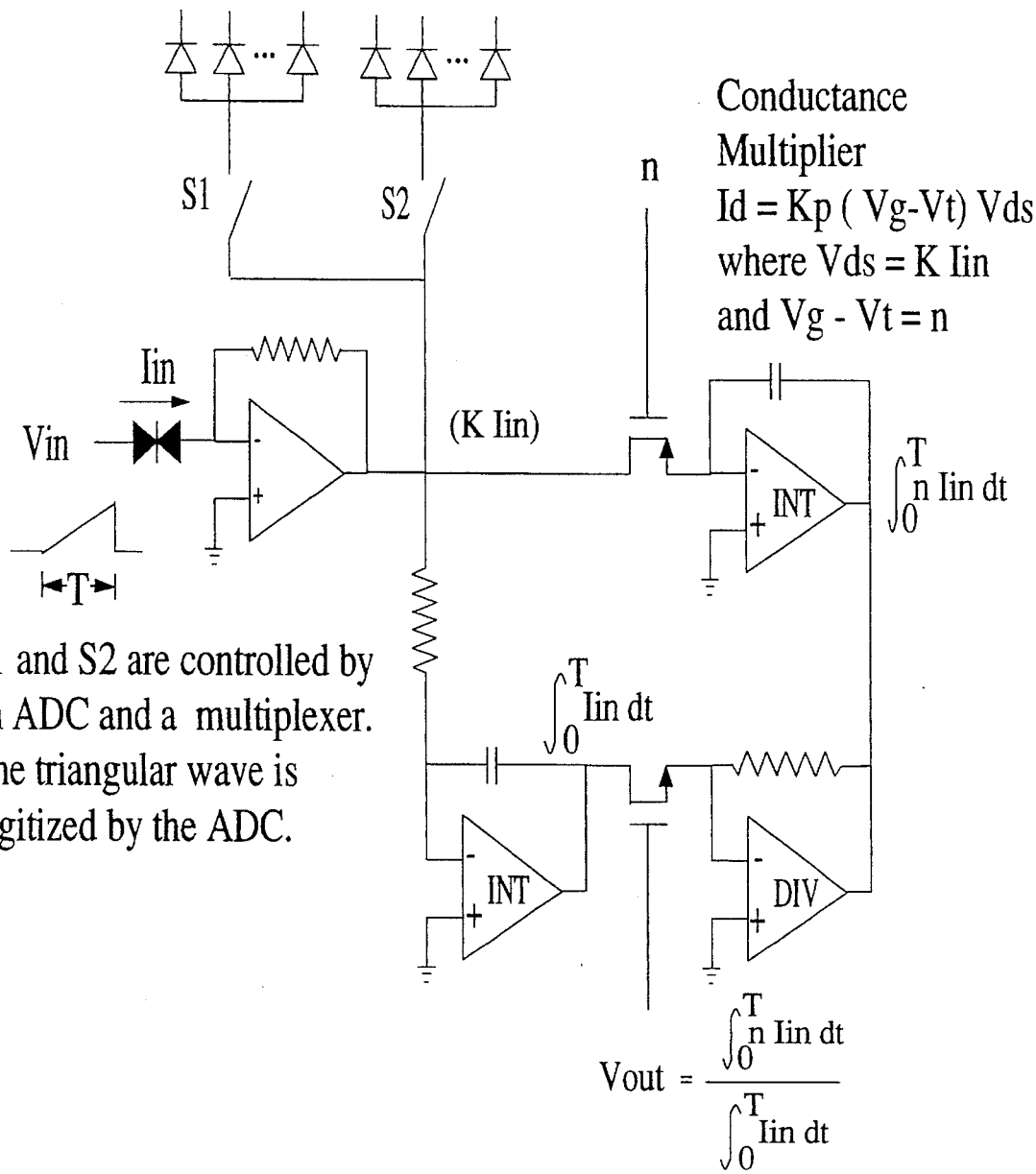
FIG. 6c shows an example of implementing defuzzification.

The defuzzification step can also be implemented with RTD. The output membership function can be generated by a circuit similar to FIG. 3a. In FIG. 6b, a triangular wave serves as Vin to sweep the input voltage of the RTD for generating different membership functions with time. Each membership function is clamped by the maximum value of the different AND outputs for a particular output membership function and also multiplexed. The maximum value is then multiplied with n and integrated to obtain the numerator value of the above equation. For the denominator, the maximum value is also fed into an integrator. Since, the numerator is the product of Vout and the denominator, the integrated output of the output membership after one sweep, weighted by the MAX value, is obtained. The integrated output is the defuzzified (crisp) output. An example of a defuzzifier circuit implementation is shown in FIG. 6c.

What is claimed is:

1. A fuzzy logic system having an input fuzzifier to generate membership functions for multiple number of labels for each antecedent and a defuzzifier to yield a crisp output from the membership functions of multiple number of output labels, comprising:

at least one single device with multiple folding voltage-curent (V-I) characteristics, means for simulating the membership functions with the current of said charactersitics and said antecedent with the voltage of said characersitics, wherein the overlapping sections of adjacent labels is obtained by:

means for adding a first current to the current of said device to obtain an additive folding V-I characterstic, means for subtracting from a second current the current of said device to obtain a subtractive folding V-I characteristic, and means for combining said additive folding folding V-I charcteristic and said subtractive folding V-I characteristic to obtain said overlapping membership functions.

2. A fuzzy logic system as described in claim 1, wherein said device is a resonant tunneling diode.

3. A fuzzy logic system as described in claim 1, wherein said means for simulating the membership function is used in said fuzzifier with input signal as said antecedent.

4. A fuzzy logic system as described in claim 1, wherein said means of simulating the output membership function is used in said defuzzifier.

5. A fuzzy logic system as described in claim 4, wherein a center of gravity method is used to obtain a crisp output from the defuzzifier.

6. A fuzzy logic system having an input fuzzifier for each antecedent and a defuzzifier to yield a crisp output for the membership function of multiple number of output labels, comprising:

at least one device with multiple folding voltage-current (V-I) characteristics, means for simulating the membership functions with the current of said characteristics and said antecedent with the voltage of said characteristics, wherein the overlapping sections of adjacent labels is obtained by:

means for adding a first current to the current of said device to obtain an additive folding V-I characterstic, means for subtracting from a second current the current of said device to obtain a subtractive folding V-I characteristic, means for clamping said subtractive current to zero to remove any negative subtractive current to obtain a clamped subtractive folding V-I characteristic, and means for combining said additive folding characteristic to obtain said overlapping membership functions.

7. A fuzzy logic system as described in claim 6, wherein said device is a resonant tunneling diode.

8. A fuzzy logic system having an input fuzzifier to generate membership functions for multiple number of labels for each antecedent and a defuzzifier to yield a crisp output from the membership functions number of output labels, comprising:

at least one device with multiple folding voltage-current (V-I) characteristics, means for simulating the membership functions with the current of said chracteristics and said antecedent with the voltage of said characteristics, wherein said means of simulating the output membership is used in said defuzzifier, and said output membership function is generated by applying a voltage ramp to said folding V-I characteristics to obtain a periodic time varying current.

9. A fuzzy logic system as described in claim 8, wherein said output membership function is processed with the inference from said fuzzifier to obtain a crisp output.

10. A fuzzy logic system as described in claim 8, wherein said device is a resonant tunneling diode.

* * * * *